United States Patent [19]

Takahashi et al.

[11] 3,892,415

[45] July 1, 1975

[54] RECORD CHANGER

[75] Inventors: Yoshio Takahashi; Kunio Abe; Haruhiko Tanaka, all of Fukuroi, Japan

[73] Assignee: Pioneer Electronic Corporation, Tokyo, Japan

[22] Filed: Oct. 25, 1973

[21] Appl. No.: 409,516

[30] Foreign Application Priority Data

Oct. 25, 1972 Japan .............................. 47-107001

[52] U.S. Cl. ............................................... 274/10 S

[51] Int. Cl. ........................ G11b 17/04; G11b 17/12

[58] Field of Search .................................... 274/10 S

[56] References Cited

UNITED STATES PATENTS

| | | | |
|---|---|---|---|
| 3,201,130 | 8/1965 | Morrison et al. | 274/10 S |
| 3,288,471 | 11/1966 | Weedfull | 274/10 S |
| 3,438,636 | 4/1969 | Carlson | 274/10 R |
| 3,534,967 | 10/1970 | Freier | 274/10 R |
| 3,697,087 | 10/1972 | Takahashi | 274/10 R |
| 3,797,834 | 3/1974 | Takahashi et al. | 274/10 S |

FOREIGN PATENTS OR APPLICATIONS

| | | | |
|---|---|---|---|
| 608,086 | 9/1960 | Italy | 274/23 |

*Primary Examiner*—Richard E. Aegerter
*Assistant Examiner*—John W. Shepperd
*Attorney, Agent, or Firm*—Sughrue, Rothwell, Mion, Zinn and Macpeak

[57] ABSTRACT

A stack of records is initially supported by opened lower claws on the spindle shaft of the record changer. A cam surface on the cam which operates the tone arm causes vertical movement of the spindle shaft which in turn causes upper spindle claws to open and support all but the lowermost record in the stack. Another cam surface on the cam causes reciprocating rotating movement of the spindle shaft which in turn causes retraction of the lower claws thereby permitting the lowermost record to drop onto the turntable.

6 Claims, 10 Drawing Figures

RECORD CHANGER

BACKGROUND OF THE INVENTION

1. Field of the Invention

This invention relates to a record changer wherein a plurality of records supported on a spindle above a turntable are lowered onto the latter successively to be thereby played.

2. Description of the Prior Art

Well known in the prior art is a record changer wherein a plurality of records are supported above the turntable by upper claws and lower claws of the spindle, whereby the records are successively brought down and played each time a previous record has been played. In such a record changer a driving shaft in the spindle supporting the records is moved upwards or downwards by utilizing the driving force for the turntable or by means of an auxiliary motor with the intervention of a cam or the like. The lowermost record is thereby separated from other records while the existence of a subsequent record is detected on the spindle and the lowermost record is brought down on the turntable to be played thereon.

However, since the above described operation is carried out by the up-down movement of the driving shaft, the distance of the displacement of the driving shaft becomes long, whereby a long spring allowing the long displacement of the driving shaft is required. Furthermore, the long spring should have a resilient force sufficient to support the plurality of records, and such a requirement renders the design of the spring extremely difficult.

SUMMARY OF THE INVENTION

Therefore, it is an object of the present invention to provide a record changer wherein the upper claws on the turntable spindle are made to open by an up-down movement of the driving shaft, while the lower claws are made to open by a rotating movement of the same shaft, whereby the required displacement of the driving shaft is shortened. Since opening of the lower claws is caused by the rotation of the driving shaft, the records can be safety supported on the spindle regardless of the number of the records.

Another object of the invention is to provide a record changer wherein the movement of the tone arm, operation of the spindle, change-over of the control switches, and the like can be carried out by a single controlling cam.

Still another object of the invention is to provide a record changer wherein the up-down movement and the rotating movement of the spindle shaft are operated independently by means of two grooves formed on the surface of a control cam.

DESCRIPTION OF THE PREFERRED EMBODIMENT

Figure 1:
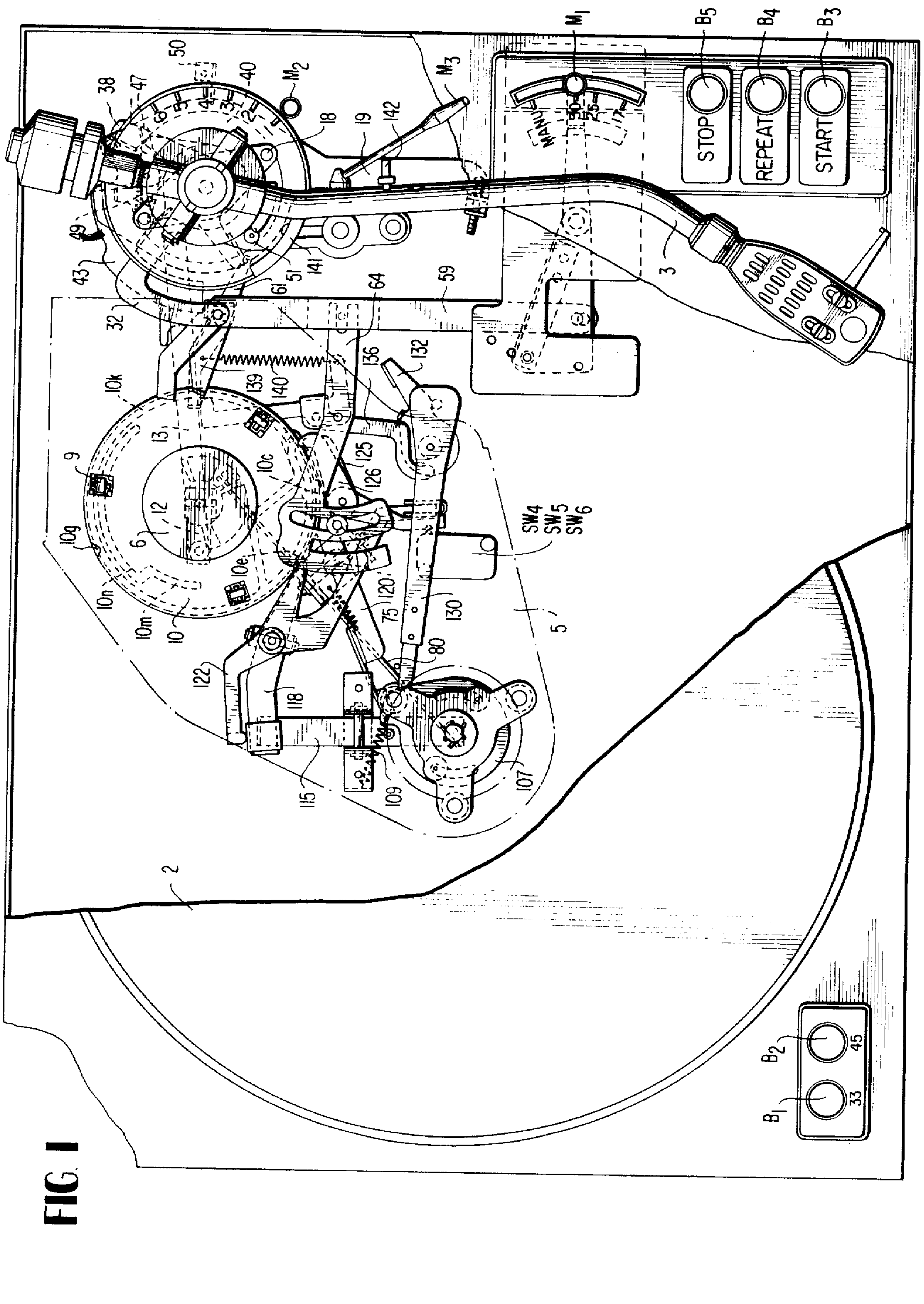
FIG. 1 is a plan view, partly frustrated, of a record changer according to the present invention.

As will be apparent from the drawings, on the structural board 1 of a record player, there are provided a turntable 2, a tone arm 3 speed-transferring buttons B1 (for 33 rpm) and B2 (for 45 rpm), play-starting button B3, a repeating button B4, a play-stopping button B5, a knob M1 to direct the moving position of the tone arm 3 corresponding to the size of a record, a knob M2 for elevating the tone arm to a height corresponding to the number of the records to be played, and a knob M3 for manually raising or lowering the pickup stylus provided at the tip of the tone arm 3.

Numeral 5 designates an auxiliary plate fixed to the structural board 1 and indicated by a one-dot-chain line. Numeral 6 designates an auxiliary motor mounted on the auxiliary plate 5 for driving the tone arm 3 and the spindle shaft. A rotating shaft 7 (FIG. 4) is rotated at a reduced speed of about 4 rpm by the auxiliary motor 6, which in turn is stopped after a rotation of every 180° by means of a switch operated by a controlling cam 10 fixed to the rotating shaft 7.

The controlling cam 10 is provided with a number of slots $10_b$ (FIG. 3) each including a roller 9 in contact with the auxiliary plate 5, a switch transferring projection $10_c$ on the outer peripheral surface thereof, a projecting strip $10_d$ for closing a switch $SW_4$, a notch $10_e$ for opening a switch $SW_5$, another notch $10_g$ for opening a switch $SW_6$, a pedestal $10_h$ for closing the switch $SW_5$, a circumferential groove $10_k$ provided on the rear surface of the controlling cam 10, an inwardly provided cam surface $10_l$, and projecting strips $10_m$ and $10_n$ for operating a detecting mechanism for detecting the termination of a play.

The projection strip $10_d$ is located at a position for opening the switch $SW_4$ at the inoperative state of the record change, and the notch $10_e$ is located at a position for opening the switch $SW_5$ at the same inoperative state. The notch $10_g$ is provided at a position for placing the switch $SW_6$ in the opened state while a record is being reproduced in the record player, and the pedestal $10_h$ is located at a side opposite to the notch $10_e$ with respect to the projection $10_c$ so that the switch $SW_5$ is kept closed while records are supported on the spindle.

The circumferential groove $10_k$ is provided adjacent to the peripheral edge of the cam, and it includes a circumferential portion H, a reduced diameter portion $L_1$ connected to one end of the circumferential portion H, and V-shaped portions $L_2$ and $L_3$ following the reduced diameter portion $L_1$. The depth of the groove portion H is made shallow while the depths of the groove portions, $L_1$, $L_2$, and $L_3$ are made deeper than the portion H. The inwardly provided cam surface $10_1$ includes high portions $I_1$ and $I_3$ and low portions $I_2$ and $I_4$.

On a downwardly projecting cylindrical portion $10_a$ of the cam 10, there are provided two parallel planar surfaces. Two rectangularly bent pieces $11_a$ and $11_b$ of a crank 11 are fixed to the planar surfaces of the cylindrical portion $10_a$ by means of screws 12, so that the crank 11 is fixedly connected to the cylindrical portion $10_a$ of the cam 10.

Screws 8 for fixing the controlling cam 10 to the rotating shaft 7 of the auxiliary motor 6 are driven through corresponding threaded holes of the piece $11_a$ of the crank 11, whereby the controlling cam 10 can be surely fixed to the rotating shaft 7 even if the cam 10 is fabricated from a molded plastic material. Furthermore, when each end of the bent pieces $11_a$ and $11_b$ is inserted into corresponding recesses provided in the cam 10, as shown in the drawing, the crank 11 can be more firmly fixed to the cylindrical portion of the cam 10. Another end of the crank 11 is connected to a lever 13, and the other end of the lever 13 is connected to a rotating plate 40.

Figure 2:
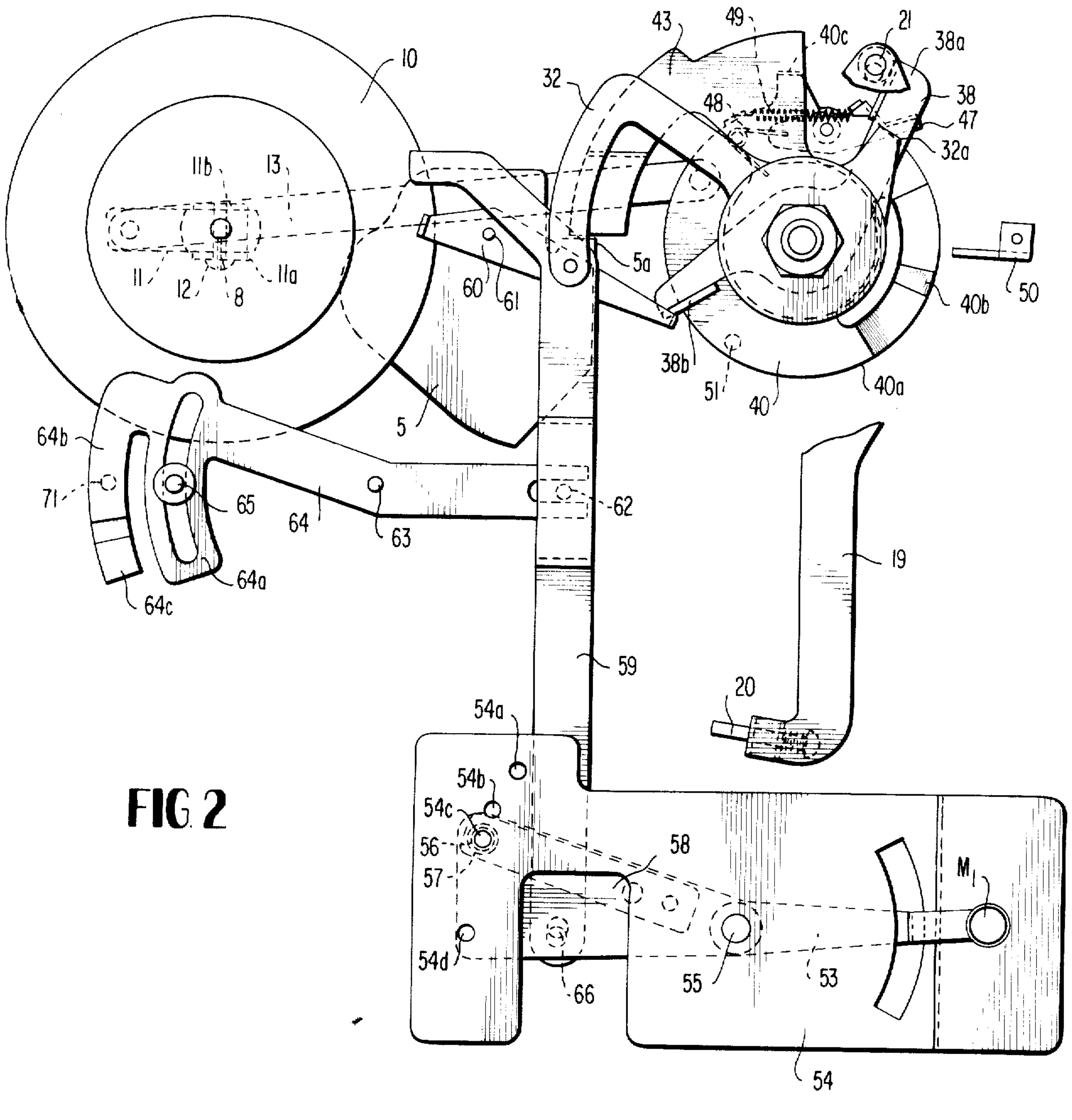
FIG. 2 is a plan view showing a selecting mechanism for the record diameter and also a moving mechanism of the tone arm, both constituting important parts of the record changer according to the invention.
Figure 6:
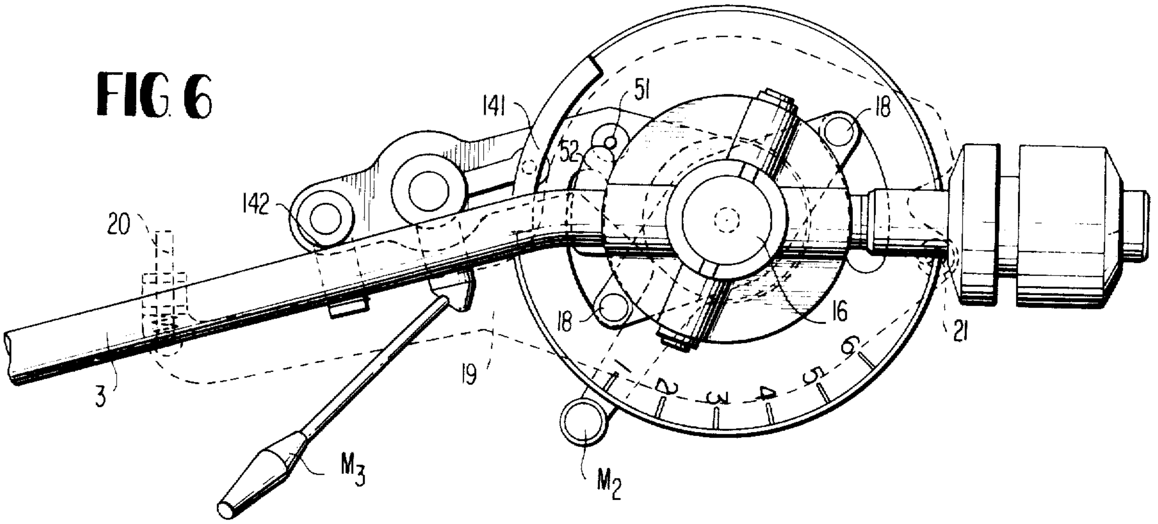
FIG. 6 is a plan view showing a tone arm of the record changer.
Figure 7:
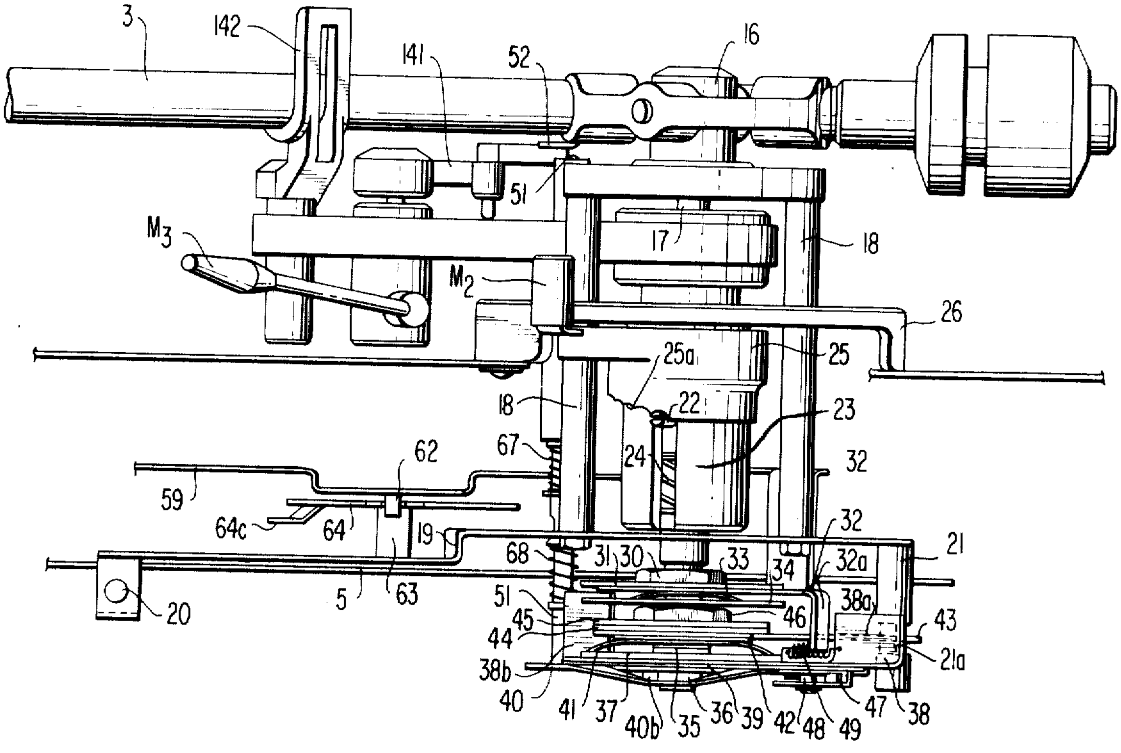
FIG. 7 is a profile view of the tone arm moving mechanism.

Referring specifically to FIGS. 2, 6 and 7, the tone arm 3 is supported by a holder 16 in such a manner that the arm 3 can be swung around a pivot in a vertical plane, and the holder 16 is in turn supported by a vertical shaft 17 in such a manner that the holder 16 is rotatable around the vertical shaft 17. The holder 16 is provided with two rods 18 extending downwardly therefrom, and an arm 19 for operating the mechanism for detecting the termination of the rendition is fixed to the lower ends of the two rods 18. At an end of the arm 19, an adjustable screw 20 is provided so that it may abut against the detecting mechanism, and at the other end of the arm 19, there is provided an eccentric pin 21 which is suitably coupled with a mechanism to operate the tone arm as will be described below.

The vertical shaft 17 supporting the holder 16 has a pin 22 fixed at an intermediate position thereof, and since the pin 22 is placed within a vertical slot provided in a supporting member 23 fixed to a panel 26 of the tone arm 3, the movement of the shaft 17 relative to the supporting member 23 is restricted merely to the vertical direction. Furthermore, the shaft 17 is urged upward by means of a spring 24 inserted in the supporting member 23, so that the pin 22 fixed to the vertical shaft 17 is urged against a cam portion $25_a$ of a record number selecting lever 25 rotatably supported on the supporting member 23. A knob $M_2$ is provided at an end of the record number selecting lever 25. The cam portion 25 is formed into a plurality of steps, the height of each step being different from that of the adjacent step by one half of the thickness of the record (that is by about 1 mm.) The panel 26 is fixed to the structural board 1 of the record player, and the supporting member 23 and a bearing portion for a lifter shaft 51, which will be described below, are fixedly mounted on the panel 26.

On the lower portion of the vertical shaft 17, a nut 30 is threadmounted, and a plane ring 31, a select lever 32, an adjusting planar spring 33, a plane ring 34, a collar 35 holding hereinafter described members, and finally a washer 36 are slipped over the lower portion of the vertical shaft 17. By this arrangement, all the members 31 through 35 are urged by the washer 36 toward the nut 30. The collar 35 has an enlarged diameter portion at its intermediate part, and a plane ring 37, a holding lever 38, another plane ring 39 are slipped over a part of the collar 35 lower than the enlarged diameter portion. A rotating plate 40, which is reciprocable under the rotation of the auxiliary motor 6, is fixed to the lower end of the collar 35 by caulking. Over the upper part of the collar 35 above the enlarged diameter portion are slipped a planar spring 41 the lower edge of which is in contact with the plane ring 37, another plane ring 42, a moving lever 43, braking felt 44, and still another plane ring 45; these elements are clamped to the upper part of the collar 35 by means of a nut 46.

The rotating plate 40 fixed to the lower end of the collar 35 by caulking has a high cam portion $40_a$ to be used for elevating or lowering the tone arm 3, a lower cam portion $40_b$, and a projecting portion $40_c$ for abutting against an end $38_a$ of the holding lever 38. Between the rotating plate 40 and the holding lever 38, there is provided a spring urging the holding lever 38 toward the rotating plate 40. On the rotating plate 40, there is pivotally supported a lever 47 to be used for bringing back the tone arm 3 to its original position. The lever 47 is urged to either one of the two positions by means of a toggle spring 48.

In the state indicated in FIG. 2, that is, in a stopped state, the lever 47 has been rotated clockwise by spring 48 to a position where the lever is abutting against the right edge of a notch formed in the rotating plate 40. In this state, the tip of the retracting lever 47 has fallen into a position where it is not in contact with the pin 21 of the arm 19. The holding lever 38 has two ends $38_a$ and $38_b$, the former end $38_a$ abutting against a noneccentric portion of the eccentric pin 21 on the arm 19, and the latter end $38_b$ abutting against an end of a lever 60 which is rotated by a select arm 53 and lever 59 for the purpose of operating the tone arm 3 manually. The moving lever 43 is urged against the felt 44 for braking purposes by means of the planar spring 41, and hence the moving lever 43 is rotated unitarily together with the rotating plate 40 when the latter is rotated in the clockwise direction. Thus, the tone arm 3 is moved to a position above the outer periphery of a record. The moving lever 43 is furthermore located at a height abutting against the eccentric portion of the pin 21 on the arm 19, and is brought back to the position indicated in FIG. 2 by the opposite rotation of the rotating plate 40, where the moving lever 43 abuts against a projection $5_a$ of the auxiliary plate 5.

The select lever 32 has a projection $32_a$ for blocking the movement of the moving lever 43, and is connected through a connecting lever 59 to the select arm 53. When the moving lever 43 abuts against the projection $32_a$, the lever 43 is held stationary despite the rotation of the rotating plate 40, thus causing slip on the braking felt 44. A pin 50 suspended from the structural board 1 abuts against the lever 47 when the rotating plate 40 is rotated in the clockwise direction, and the lever 47 is thereby shifted in the counter-clockwise direction. Thus, the tip of the lever 47 is raised outwardly so that it may abut against the eccentric pin 21 on the arm 19.

Numeral 51 designates a lifter shaft for elevating the tone arm 3, which is slidably supported on the panel 26, and the lower end $51_b$ of shaft 51 is urged against the cam portion $40_a$ or $40_b$ of the rotating plate 40 by means of a spring 67. The upper end $51_a$ of the lifter shaft 51 is designed so that it can contact a piece of plate 52 fixed to the tone arm 3. Thus, when the lower end $51_b$ of the lifter shaft abuts against the lower cam portion $40_b$, the upper end $51_a$ thereof is separated from the piece of plate 52, and the tone arm 3 is made available to play a record. A spring 68 is further provided so that the lower end thereof is fixed to the lifter shaft 51 and the upper end thereof urges the arm 19 when the lifter shaft 51 is abutting the higher cam portion $40_a$ of the rotating plate 40, thereby preventing the tone arm 3 from being rotated freely. When the lifter shaft 51 is shifted to the lower cam portion $40_b$, the upper end of the spring 68 is separated from the arm 19, and the tone arm 3 can be rotated freely.

A select arm 53 is pivotally supported by a shaft 55 fixed to a plate 54 which in turn is fixed to the structural board 1 of the record player, and a knob $M_1$ manually operated from outside is provided at one end of the select arm 53. A hold 57 holding a metal ball 56 is provided in the end portion of the select arm 53 opposite to the knob $M_1$ with respect to the pivotal shaft 55, and a planar spring 58, one end of which is fixed to the select arm 53, urges the metal ball 56 toward the plate 54. In the plate 54, there are provided holes $54_a$, $54_b$, and $54_c$ each engageable with the metal ball 56, whereby the rotating position of the select lever 32 engaging the moving lever 43 is determined selectively, and the moving lever 43 moves the tone arm 3 selectively to a peripheral edge of a phonograph record having a diameter of 17 cm, 25 cm or 30 cm.

The select arm 53 is connected with an interlinking lever 59 through an eccentric pin 66, and the other end of the interlinking lever 59 is coupled with the select lever 32. The end of the interlinking lever 59 is further bent leftwardly as seen in FIG. 2, and when the tone arm 3 is operated manually, the bent portion of the lever 59 causes to rotate a lever 60 pivotally supported by a pin 61 in such a manner that the holding lever 38 is thereby rotated in the clockwise direction. The interlinking lever 59 is further provided with a pin 62 in the intermediate portion thereof, and the pin 62 engages one end of a cam lever 64 pivotally supported by a pivot pin 63. The cam lever 64 is guided by a guiding shaft 65 fixed to the upper surface of the auxiliary plate 5 and engaged in a curved slot $64_a$ provided at the other end of the cam lever 64, and on the end of the cam lever 64 outwardly of the curved slot $64_a$, cam portions $64_b$ and $64_c$ are provided. When the knob $M_1$ is shifted to the manual position for manually operating the tone arm 3, the cam portion $64_c$ pushes down a shaft 71.

Figure 3:
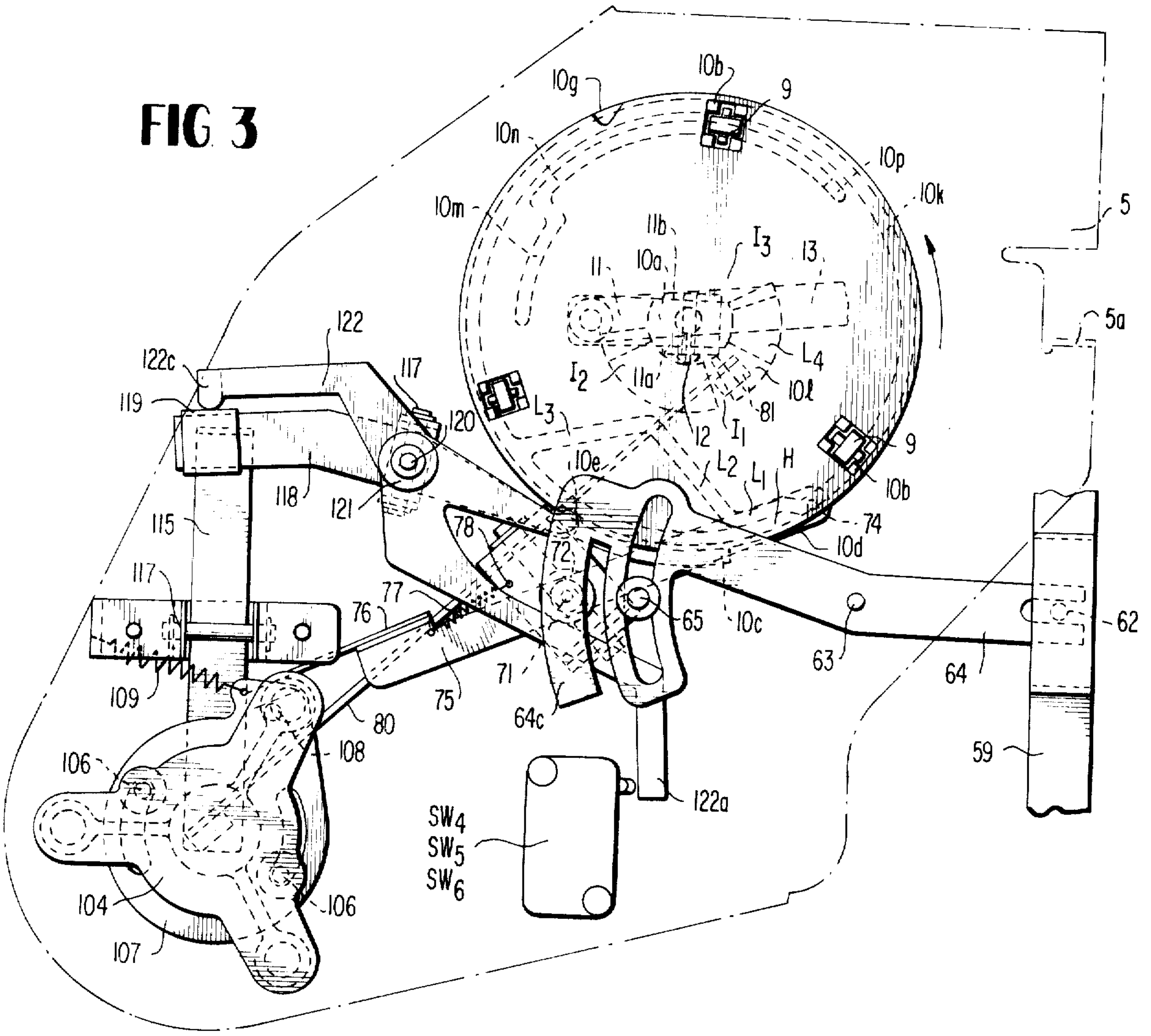
FIG. 3 is a plan view showing a spindle driving mechanism of the record changer.
Figure 4:
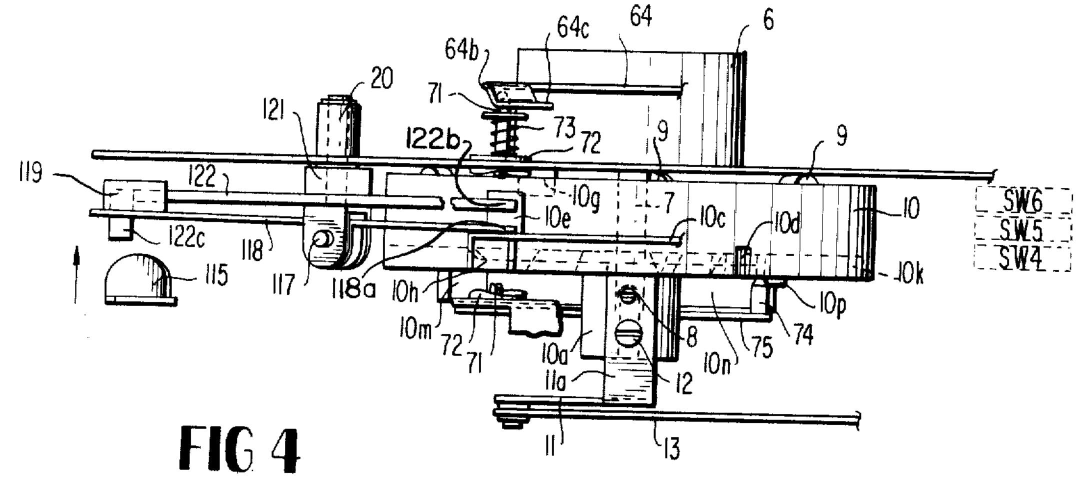
FIG. 4 is a front view of the mechanism shown in FIG. 3.

As shown in FIGS. 3 and 4, the shaft 71 is slidably supported by a supporting member 72 fixed to the auxiliary plate 5 in such a manner that the upper end of the shaft 71 is urged against the cam portion of the cam lever 64 by a spring 73. The lower end of the shaft 71 is fixed to a cam follower 75 for rotating a shaft 85 of a spindle 83 at an end of which is provided a pin 74 engaging the outer peripheral groove $10_k$ of the control cam 10. The cam follower 75 has a planar spring 76 on the end thereof for transmitting a torque thereof to a spindle-rotating plate 107, and the cam follower 75 is urged in the clockwise direction by means of a spring 77 extended between the cam follower 75 and a supporting member 78 fixed to the supporting member 72. Another cam follower 80 for moving the shaft 85 of the spindle 83 vertically is movably supported by the supporting member 78. A roller 81 contacting the inner peripheral cam $10_i$ of the control cam plate 10 is supported on one end of the cam follower 80, and the other end of the cam follower 80 is located below the shaft 85 of the spindle 83.

Figure 8:
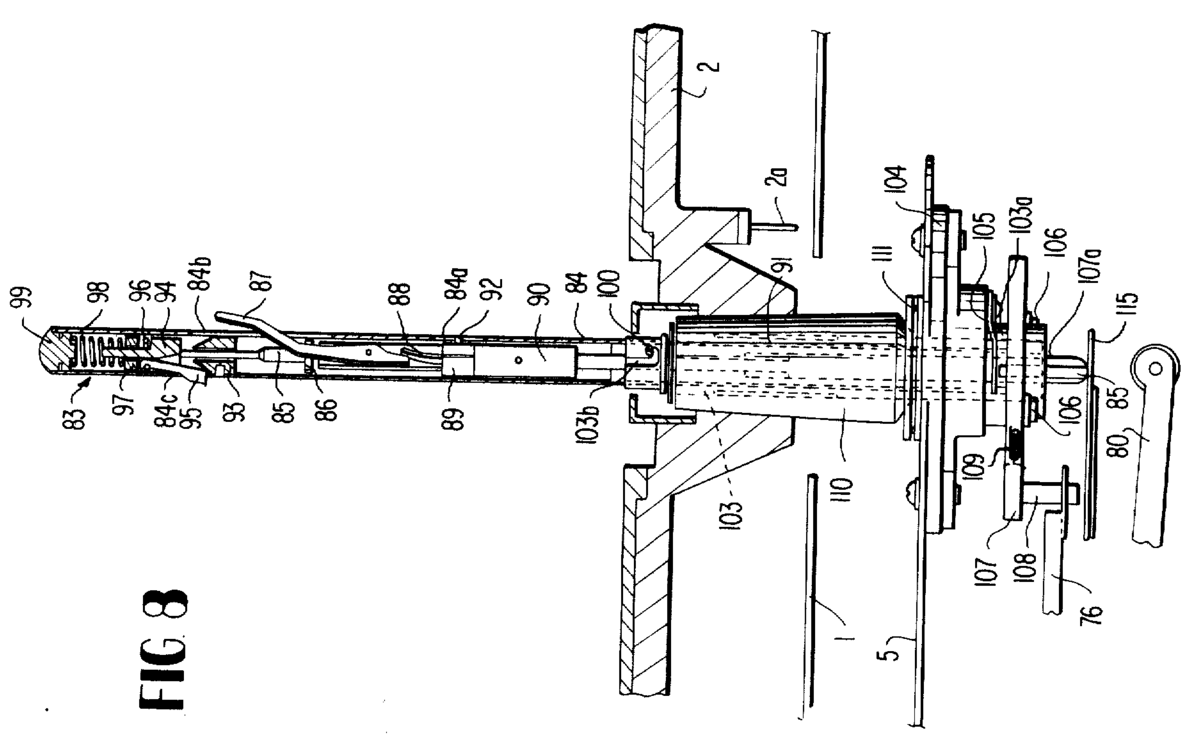
FIG. 8 is a front view partly frustrated of a record supporting spindle wherein the upper and lower claws are in the opened state.

As shown in FIG. 8, the spindle 83 includes: an outer sheath 84 having an elongated window $84a$ arranged at a lower position, three windows $84b$ arranged at the upper portion of the elongated window $84a$ and separated by 120° around the periphery of the sheath, and three windows $84c$ arranged at an upper portion of the three windows $84b$ and separated by 120°, with corresponding windows $84b$ and windows $84c$ being shifted 60° relative to each other and the elongated window $84a$ and windows $84b$ and $84c$ are elongated along the longitudinal axis of the sheath; a cam plate 86 fixed on shaft 85 and having three engaging portions for engaging the three lower claws 87, respectively; a holder 89 pivotally supporting three lower claws 87 and provided with three leaf springs 88 abutting against the lower ends of the corresponding lower claws 87 for projecting the upper ends of the claws 87 outwardly from windows 84b of the sheath 84; a tube 90 fixed on the shaft 85 for supporting the holder 89; and a guide 91 inserted from the lower end of the outer sheath 84. The shaft 85 of the spindle 83 passes through the centers of all of the above-mentioned members and through a conical cam 93 of the spindle 83, and the cam plate 86 and the tube 90 are fixed to the central shaft 85. Since a pin 92 fixed to the holder 89 is positioned in the elongated slot 84a of the outer sheath 84, the holder 89 can be moved only vertically along its longitudinal axis.

On the upper part of the shaft 85 projecting upwardly from the conical cam 93 fixed to the outer sheath 84, three upper claws 95 are held by a resilient ring 96 on an upper claw holder 94 which is urged downwardly by means of a spring 98 through a ring 97. In the standstill condition shown in FIG. 2, the upper claws 95 provided on the upper claw holder 94 are pushed down along the conical cam 93 by the spring 98 so that the ends of the claws 95 are forced out of the windows $84_c$ of the outer sheath 84. The outward movements of the upper claws 95 are stopped when the lower ends of the claws abut against the lower edges of the windows $84_c$. Numeral 99 designates a cap provided at the upper end of the spindle 85. Numeral 100 designates a pin projecting from the outer sheath 84 of the spindle 83 for fixing the spindle 83 to the L-shaped groove $103_b$ in the turntable shaft 103. In the drawing, the distance between the upper claws 95 and the lower claws 87 is made equal to a distance adapted to separate the lowermost record from the stack of phonograph records.

The shaft 103 of the turntable is fixed to a pedestal 104 which is in turn fixed to the auxiliary plate 5, and a window $103_a$ is provided at a position aligned with the lower surface of the pedestal 104. A planar spring 105 fixed to the pedestal 104 for securing the spindle 83 to the pedestal is partly inserted in the window $103_a$. A spindle rotating plate 107 having a pin 108 is suspended rotatably by means of pins 106 provided on the pedestal 104. The shaft 85 of the spindle 83 penetrates the central hole $107_a$ of the spindle rotating plate 107. The spring 76 of the cam follower 75 abuts against the pin 108 of the rotating plate 107, whereby the shaft 85 of the spindle 83 can be rotated in accordance with the rotation of the control cam plate 10.

Numeral 109 designates a spring extending between the auxiliary plate 5 and the spindle rotating plate 107 and which urges the spindle rotating plate 107 in the counterclockwise direction. Numeral 110 is a bearing supporting the turntable 2 and is mounted on a thrust bearing 111 provided on the auxiliary plate 5.

Numeral 115 is a lever for detecting whether a record is supported by the lower claws on the spindle 83 or not, and in the drawing, the central shaft 85 of the spindle 83 is maintained at a position wherein the upper end thereof abuts the upper claw holder 94.

Numeral 118 (FIGS. 3 and 4) designates a transferring lever which is supported on the shaft 117 to be moved vertically in a seesaw-like manner. An end 118$_a$ of the transferring lever 118 is in contact with the outer periphery of the controlling cam 10, and the other end thereof is connected with a weight 119 for lifting the end 118$_a$ upwardly. The lever 115 and the transferring lever 118 are rotated around the pivotal points by the weight of records when the records are supported on the spindle 83 so that the end 118$_a$ of the lever 118 is thereby lowered.

The shaft 117 is fixed to the lower end of a bearing 121 which is supported to be horizontally rotatable by a shaft 120. A horizontally swingable switch lever 122 is also pivotally supported by the shaft 120, and the switch lever 122 has three arms emanating from the pivotal point 120. A first arm 122$_a$ abuts against an operating end of a switch SW5, a second arm 122$_b$ contacts the outer periphery of the controlling cam 10, and a third arm 122$_c$ abuts against the weight 119 applied to the transferring lever 118. When records are supported on the spindle 83, the end of the arm 122 is prevented from abutting against the weight 119, and the arm 122$_a$ maintains the closed state of the switch SW5.

Figure 5:
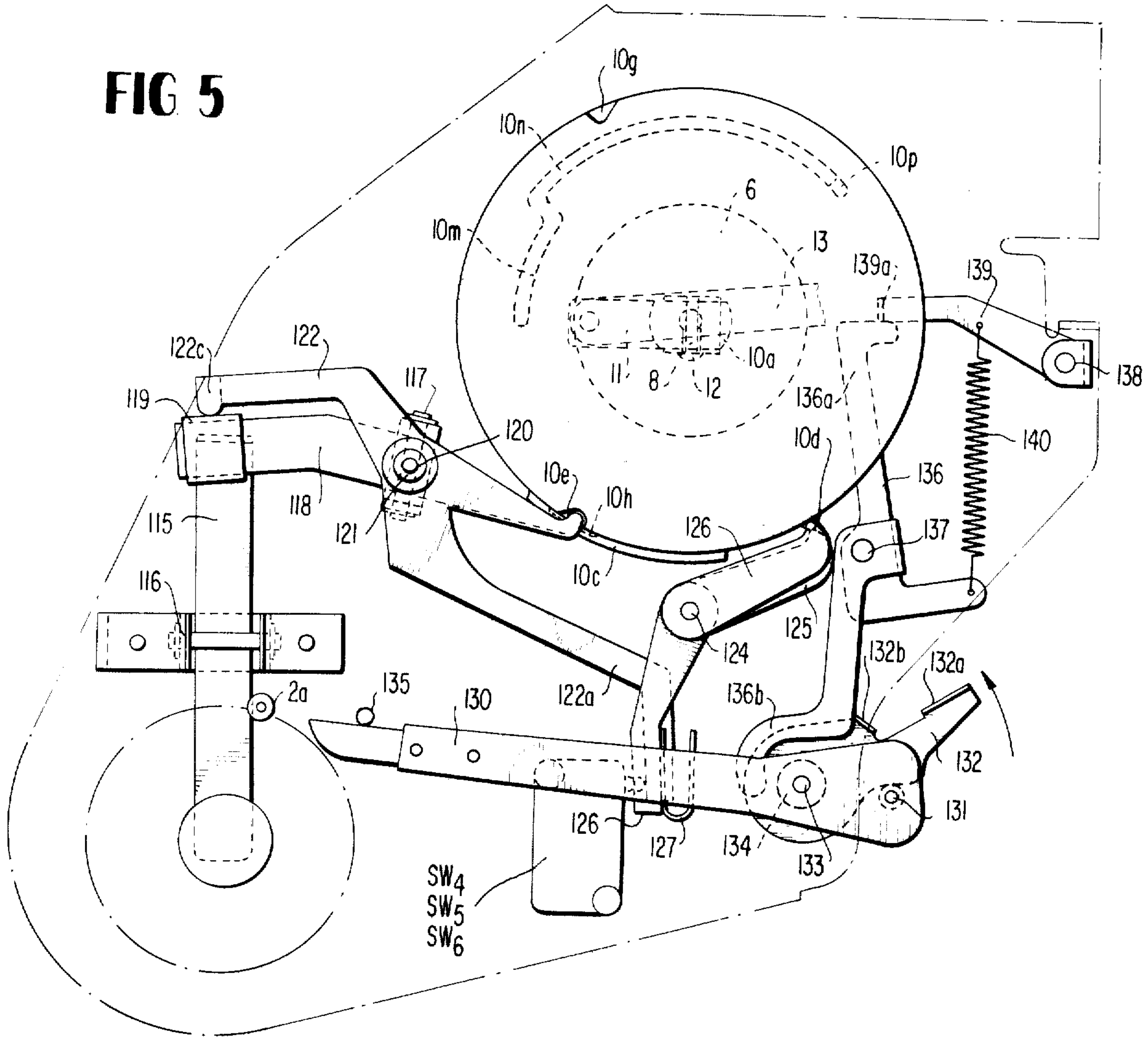
FIG. 5 is a plan view showing a mechanism for detecting the termination of the record reproduction and also a mechanism for operating switches.

Switches SW4, SW5, and SW6 are provided on the auxiliary plate 5 in an overlapping relation in this order starting from below. The shaft 124 rotatably supports a cut lever 125 and a return lever 126; in FIG. 5 showing a stationary state, an end of the cut lever 125 is on the projection 10$_a$ of the controlling cam 10, and the other end thereof depresses the normally closed switch SW4 for opening the same. On the other hand, the switch SW5 is opened because the end 122$_a$ of the switching lever 122 is in the groove 10$_c$ of the controlling cam 10, and the switch SW6 is kept in the closed state because the return lever 126 is out of the groove 10$_d$ of the controlling cam 10. Furthermore, a U-shaped leaf spring 127 is provided on the return lever 126 to be rotated by a later described detecting device for detecting the termination of record reproduction.

Numeral 130 designates a stop lever which is provided for starting the auxiliary motor 6 with the rotating inertia of the turntable 2 being utilized when the reproduction of a record terminates. The stop lever 130 is pivoted by a shaft 133 on the lower end of which is fixedly mounted a detecting lever 132, and is placed on a collar 134 also fixed to the shaft 133. An end of the stop lever 130 is sharpened like a knife, and when the tone arm is in grooves having a greater pitch and which are formed on the inner periphery of a record, the sharpened end of the stop lever 130 enters the rotating path of a pin 2$a$ provided on the lower surface of the turntable 2 and is rotated until it engages a stopper 135 which stops the rotation of the stop lever 130. The detecting lever 132 has a bent portion 132$_a$ abutting the arm 19 rotated with the tone arm 3 and another portion 132$_b$ abutting the lever 136. The detecting lever 132 is made of a light material so that no malicious effect is caused in the tracking of the record groove by the tone arm 3, and is supported on a bearing so that the lever 132 is rotated by a slight torque. The lever 136 is pivotally supported by a shaft 137, and a spring 140 is provided between the lever 136 and another lever 139 which is also pivotally supported by a shaft 138 and having an engaging portion 139$_a$, so that the engaging portion 139$_a$ is engaged with an end 136$_a$ of the lever 136. Another end 136$_b$ of the lever 136 depresses the lever 126 having the planar spring 127 at an end thereof, and the planar spring in turn operates the switch SW6 as described above. The middle portion of the lever 136 depresses the detecting lever 132, thereby to keep the stop lever 130 abutting with the stopper 135 through the intervention of the pin 131.

Figure 10:
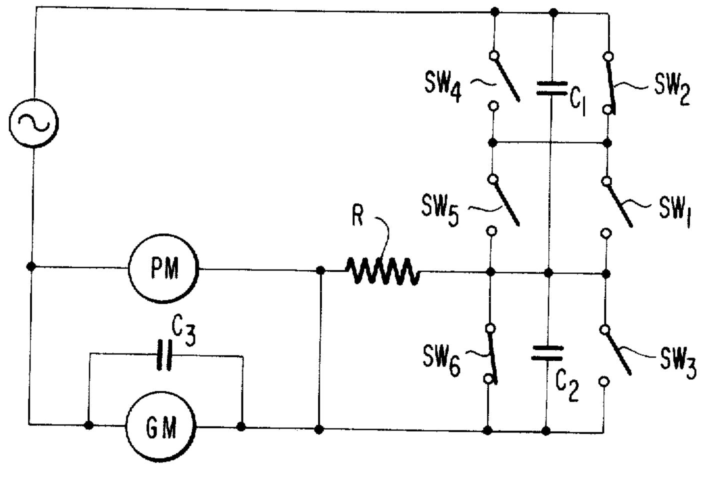
FIG. 10 is a control circuit of the record player wherein the record exchanger according to the present invention is included.

FIG. 10 is a circuit diagram showing the stationary state of the record player. In the drawing, switches SW2 and SW4, SW1 and SW5, and SW3 and SW6 are connected in parallel, respectively, and the resulting parallel-connected switch pairs are connected in series with each other and also to a motor PM for driving the turntable and to the auxiliary motor 6, both motors being connected in parallel. Capacitors C1, C2 and C3 are inserted in the circuit for eliminating noises caused by the operation of the switches, and a resistor R is inserted therein for reducing a voltage.

Numeral 141 in the previous drawings designates an elevation member for elevating or lowering the tone arm manually. The elevation member 141 can be lowered by throwing the knob M3 toward the front side. Numeral 142 designates an arm rest.

The operation of the record player according to the present invention will now be described.

PREPARATION FOR REPRODUCTION

The spindle 83 is first inserted in the shaft 103 of the turntable 2 so that the pin 100 of the spindle is placed in the L-shaped groove 103$_b$ of the shaft 103. More specifically, the spindle is forced against the resilience of the planar spring 105 into the shaft 103, and then the spindle is rotated around its axis so that the pin 100 is driven along the lateral portion of the L-shaped groove. When the spindle is free from the depression and rotation, the pin 100 enters the vertical portion of the L-shaped groove 103$_b$ and the spindle 83 is therein fixed by the resilience of the planar spring 105. Thus, there is no fear of the spindle 83 being dropped out of the shaft 103, even if the spindle is thereafter pushed up or rotated around its axis. The shaft 85 of the spindle 83 is in this case resting in the central hole of the spindle rotating plate 107.

At this time, the roller 81 of the cam follower 80 is on the higher cam portion l$_1$ of the inner peripheral cam 10$_1$ of the control cam 10, whereby the other end of the cam follower 80 is raised. The shaft 85 of the spindle 83 is thus brought up with the lower claws 87 being opened and the upper claws 95 being pushed into the spindle 82 in a closed state, because the upper-claw holder 94 is raised against the resilience of the spring 98 (see FIG. 9). The records to be played (in this example, a plurality of records from one to six can be continuously played) are then placed on the lower claws 87 of the spindle 83 to be supported thereby. The knob M2 is moved to the position aligned with the number indicated on the panel 26 in accordance with the number of the records. Thus, the selecting lever 25 is rotated, and the shaft 17 urged upward by the spring 24 is moved in the vertical direction in accordance with the cam $25_a$ of the selecting lever 25. More specifically, the pin 22 on the shaft 17 engages the cam portion of cam $25_a$ corresponding to the number of records. Since the cam portion has steps differing in height by one half of the thickness of a record, the tone arm is moved to reproduce the records evenly and satisfactorily.

When it is desired to manually place the tone arm on the record, the knob M1 is brought to a position indicated MANU, and when an automatic play is desired, the knob is brought to one of the 30, 25, and 17 cm positions in accordance with the diameter of the records. The rotating speed of the turntable can be selected to be either 33 rpm or 45 rpm by pushing push buttons B1 or B2. When an automatic play is desired, the knob M3 of the elevation member 141 is positioned as shown in FIGS. 6 and 7 so that the elevation member 141 is lowered.

AUTOMATIC REPRODUCTION OF RECORD

In the case where records of 30 cm in diameter are to be reproduced, the knob M1 is brought to a position indication as 30, so that the ball 56 urged by the planar spring 58 on the select arm 53 is brought into engagement with a hole $54_c$ in the plate 54. The movement of the select arm 53 rotates the select lever 32 through the intervention of the interlinking lever 59, and the position of the projection $32_a$ abutting with the moving lever 43 is thereby decided. In this case, the relative position of the select lever 32 against the position of the select arm 53 may be changed by rotating the eccentric shaft 66 which is provided on the select arm 53 for connecting the arm 53 to the interlinking lever 59, whereby the position of the tone arm can be adjusted so that the arm is correctly placed above the outer peripheral groove of the record.

Furthermore, when the records are reproduced automatically, that is, when the tone arm is moved onto the records automatically, the end of the interlinking lever 59 does not abut the lever 60. In addition, the cam portion $64_b$ of the cam lever 64 abuts the upper end of the shaft 71, and hence the cam lever 64 rotated by the pin 62 provided at the intermediate position of the interlinking lever 59 cannot push the cam follower 75 downwardly.

Upon depressing the reproduction start button B3, the switch SW1 in FIG. 10 is closed, and the turntable motor PM and the auxiliary motor 6 start. By the start of the auxiliary motor 6, the control cam 10 fixed to the rotating shaft 7 is rotated counter-clockwise, and the tip of the cut lever 125 is disengaged from the projection $10_d$ of the control cam 10. Thus, the switch SW4 is closed, and the tip $122_a$ of the switch lever 122 steps out of the notch $10_c$ of the control cam 10. At this time, the switch SW5 is also closed, and the two motors PM and 6 are continuously rotated by the depression of the reproduction start button for a short period. In accordance with the rotation of the control cam 10, the transfer lever 118, so far abutting with the projection $10_c$ as shown in FIGS. 3 and 4, is released from the projection $10_c$, and the roller 81 of the cam follower 80, so far on the high portion $I_1$ of the inner peripheral cam $10_i$, is moved to the low portion $I_2$. Thus, the shaft 85 of the spindle 83 is brought down under the weight of the records, and the upper claws 95 are pushed out of the window $84_c$ in the outer sheath of the spindle 83 because the upper claw holder 94 is pushed down by the spring 98 thereby forcing the upper claws 95 outwardly along the conical cam 93. Thus, the records so far supported by the lower claws 87 are supported by the upper claws 95 except for the lowermost record which is still supported by the lower claws 87. The shaft 85 of the spindle 83 is shifted downward by the weight of the record supported by the lower claws 87.

The pin 74 of the cam follower 75 which has been in the peripheral groove $10_k$ in the stationary state, as shown in FIG. 3, is now shifted into a deeper groove portion $L_1$ which is parallel to the shallow H portion of the groove $10_k$, and the shaft 85 of the spindle 83 is thereby allowed to descend as described above. The pin 74 is thereafter shifted into the groove $L_2$, and the cam follower 75 is rotated around the shaft 71 in the counter-clockwise direction. The planar spring 76 on the other end of the cam follower 75 abuts against the pin 108 of the spindle rotating plate 107 and rotates the latter against the resilience of the spring 109. Thus, the spindle shaft 85, fitting in the central hole of the spindle rotating plate 107, is rotated in the clockwise direction. Upon rotation of the spindle shaft 85, the cam plate 86 fixed to the shaft 85 is rotated, whereby the lower claws 87 are rotated against the resilience of the spring 88 and are retracted into the sheath 84 of the spindle 83.

The record supported by the lower claws 87 is now lowered onto the turntable. After the descension of the record, the pin 74 of the cam follower 75 is shifted into the groove $L_3$, and the cam follower 75 is rotated in the opposite direction so that the lower claws 87 are thereby opened. Since the roller 81 of another cam follower 80 is thus shifted to the higher inner peripheral cam $I_3$, the spindle shaft 85 is again brought up, thereby closing the upper claws 95, and the records supported by the upper claws are now shifted onto the lower claws 87.

When the control cam is rotated by 180° from the position indicated in FIGS. 1 and 5, the return lever 126 enters the notch $10_a$ of the control cam 10 thereby to open the switch SW6. The auxiliary motor 6 now stops, and the turntable-rotating motor PM is energized through the voltage reducing resistor R to reproduce the record. At this time, the projection $10_m$ having a smaller diameter depresses the end $136_a$ of the lever 136 before the rotation of the control cam stops with the end $136_a$ kept abutting against the tip of the lever 139, whereby the other end $136_b$ of the lever 136 is disengaged from the projection $132_b$ of the detecting lever 132, and the stop lever 130 is rotated freely.

The movement of the tone arm 3 allows the rotation of the auxiliary motor 6, and also rotates the rotating plate 40 through the crank 11 provided on the control cam 10 and the lever 13. In this case, since the collar 35 and the nut 46 caulked thereto in an integral manner are rotated together with the rotating plate 40, the moving lever 43 depressed onto the felt 44 by means of the planar spring 41 is also rotated simultaneously so that the lever 43 is brought nearer to the eccentric pin 21 on the arm 19 of the tone arm 3. When the pin 74 of the cam follower 75 is shifted from the portion $L_2$ to the portion $L_3$ of the outer peripheral groove $10_k$ as described above, the moving lever 43 abuts against the eccentric portion $21_a$ of the eccentric pin 21 on the arm 19. During this time, the holding lever 38 is pulled by a tension spring 49 provided between the holding lever 38 and the rotating plate 40, whereby the tone arm 3 is not moved out of the arm rest 142. By the above described construction, any possibility of the tone arm being damaged on the turntable while the record is brought down from the spindle onto the turntable can be eliminated. The moving lever 43, abutting against the eccentric pin 21, and the holding lever 38 hold the eccentric pin 21 on both sides thereof and rotate the same. Thus, the tone arm is rotated toward the turntable until the end of the moving lever 43 abuts against the projection $32_a$ of the select lever 32. At this instant, the tone arm is located just above the non-recorded peripheral portion of the recording disc.

When the projection 40c depresses the holding lever 38 out of engagement with the eccentric pin 21 and the rotating plate 40 further rotates so that the lower cam portion $40_b$ is moved below the shaft 51 of the arm lifter, the shaft 51 is lowered by means of the spring 67 until the upper end $51_a$ of the shaft 51 is disengaged from the planar member 52 so far supporting the shaft 51, whereby the tone arm 3 descends and the reproduction of the record is started. In accordance with the descension of the shaft 51, the spring 68 releases the depression of the arm 19 of the tone arm, so that the tone arm can be freely rotated on the shaft 17.

The lever 47 provided on the rotating plate 40 for the retraction abuts against the pin 50 before the descension of the tone arm, the lever 47 thereby rotating in the counter-clockwise direction. The lever 47 is thus maintained in the rotated state by means of the toggle spring 48, and the tip of the lever 47 may now abut against the pin 21 of the arm 19.

TERMINATION OF THE RENDITION OF THE RECORD

When the rendition of the record approaches its end, the spring 20 at the end of the arm 19 rotating together with the tone arm abuts against the projection $132_a$ of the detecting lever 132 and rotates the detecting lever 132 gradually in the counter-clockwise direction. The stop lever 130 supported by the collar 134 fixed to the shaft 133 of the detecting lever 132 is thus rotated together with the detecting lever 132, and is brought nearer to the rotating path of the pin $2_a$ of the turntable. However, the tip of the stop lever 130 is pushed out of the path of the pin $2_a$ during the ordinary reproduction of the record since the pitch of the recording grooves is extremely small, whereby the stop lever 130 slips around the periphery of the collar 134 and only the detecting lever 132 is rotated.

When the reproduction is terminated and the stylus of the pickup enters the groove having a greater pitch, the detecting lever 132 is rotated to a greater extent, thereby correspondingly rotating the stop lever 130 held thereon. The stop lever 130 is thus brought into the path of the rotating pin $2_a$ and is forced to rotate in the counter-clockwise direction until the stop lever 130 is pushed out of the rotating path of the pin $2_a$. At this instant, the pin 131 of the stop lever 130 depresses the detecting lever 132, so that the projection $132_b$ of the detecting lever 132 rotates the lever 136 in the clockwise direction, and the end $136_b$ thereof is depressed by the planar spring 127 on the return lever 126 to close the switch SW6. The closure of the switch SW6 causes the auxiliary motor 6 to start again, and the other end $136_a$ of the lever 136 engages the projection $139_a$ of the lever 139 urged by the spring 140 so that the switch SW6 is maintained in the closed state.

When the control cam 10 starts rotating, the tip of the lever 136 abuts against the projection $10_a$ having a greater diameter, thereby being rotated further in the clockwise direction, and, since the other end $136_b$ of the lever 136 has been disengaged, the stop lever 130 is kept outside of the path of the pin $2_a$.

Owing to the counter-clockwise rotation of the rotating plate 40, the shaft 51 of the arm lifter is shifted from the lower cam portion $40_b$ to the higher cam portion $40_a$ thereby to elevate the tone arm 3 from the record, and due to the depression of the arm 19 of the tone arm by the upper end of the spring 68 attached to the shaft 51, any abrupt horizontal swing of the tone arm is prevented. When the lever 47 depresses the non-eccentric portion of the pin 21 on the arm 19, the tone arm is rotated onto the arm rest 142 and remains there. When the swinging movement of the tone arm is thus stopped, the lever 47 is rotated in the clockwise direction due to the rotation of the rotating plate 40, thereby falling down as shown in the drawing, and is held by the toggle spring 48. Furthermore, the moving lever 43 is moved together with the rotating movement of the rotating plate 40, and when the lever 43 abuts against the projection $5_a$ of the auxiliary plate 5, the moving lever 43 is stopped regardless of the rotation of the rotating plate 40.

After the tone arm starts rotating, the lever 136 is disengaged from the projection $10_a$ of the control cam 10, and is rotated in the counter-clockwise direction by the resilience of the spring 140, thus rotating the stop lever 130 in the clockwise direction through the detecting lever 132 until the stop lever 130 is brought out of the rotating path of the pin $2_a$ of the turntable. The stop lever 130 is thereby brought back to a position as shown in FIG. 5 to engage the stop 135. Since the projection $10_b$ of the control cam 10 is lower than the projection $10_a$ thereof, the lever 136 is allowed to be rotated, and only the lever 139 abuts the projection $10_b$. Thus, when the levers 136 and 139 are disengaged from the projection $10_a$ in accordance with the rotation of the rotating cam 10, the reengagement of the lever 136 with the projection $139_a$ of the lever 139 is prevented by the arrangement of the projections $10_b$ and $10_a$. Furthermore, the length of the projection $10_a$ is so selected that, when the lever 136 is released, the tone arm is moved to a position wherein the spring of the arm 19 does not abut the projection $132_a$ of the detecting lever 132.

The cam follower 80 then moves from the higher cam portion $I_3$ to a lower cam portion $I_4$ and detects the existence of a record on the lower claws 87 of the spindle 83. More specifically, in FIGS. 3 and 9, when the roller 81 of the cam follower 80 moves to the lower cam portion $I_4$, the shaft 85 of the spindle 83 is lowered to a position (*a*) in FIG. 9 (wherein the upper claws 95 are opened and the lower ends thereof are abutting against the edge of the window $84_c$ of the outer sheath 84 for the spindle 83) under the action of the spring 98 in the spindle 83. At this time, if the lower claws are not supporting a record, the shaft 85, which is supported by the lever 115, is not lowered in excess of the above-mentioned position (*a*), whereby the tip of the lever 118 is held above the projection $10_c$ provided on the outer periphery of the control cam 10, and the tip $122_b$ of the switch lever 122 enters the notch $10_c$ of the control cam 10 as shown in FIGS. 3 and 5, while the other end $122_a$ of the switch lever 122 opens the switch SW5 so that the motor PM and the auxiliary motor 6 are thereby stopped.

Figure 9:
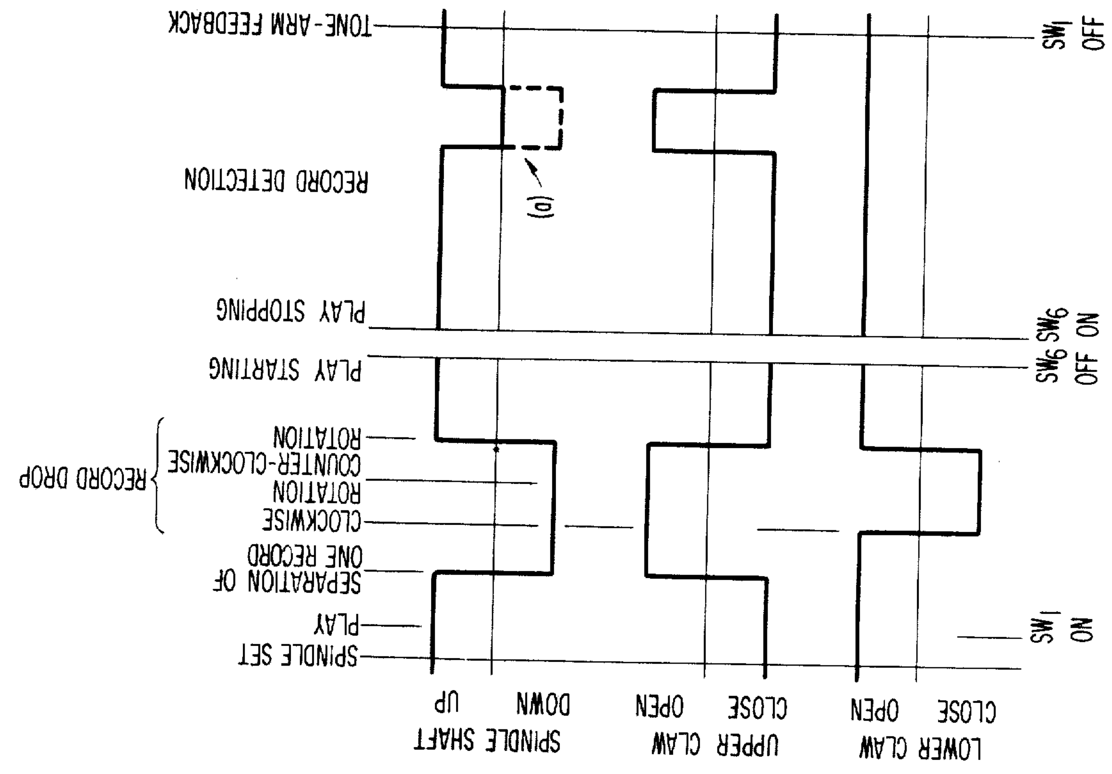
FIG. 9 is a diagram showing the operation of the spindle.

If the lower claws are supporting record(s), the shaft 85 and the lever 115 are pushed down by the weight of the record from the position (*a*) to the position shown by broken lines in FIG. 9, whereby the other end of the lever 115 lifts the transfer lever 118 and lowers the other end of the lever 118. The other end of the lever 118 is thereby brought to a position below the outer peripheral projection $10_e$ of the control cam 10, and, when the control cam 10 is rotated to the stopped position as shown in FIGS. 3 and 5, the end of the lever 118 is shifted to a pedestal portion $10_h$ corresponding to the notch $10_c$, whereby the end $122_c$ of the switching lever 122 is caused to abut the weight 119 on the transfer lever 118, and further rotation thereof is prevented. As a result, the switch SW5 is held in the closed state, and the above described rendition operation is repeated.

The pedestal portion $10_h$ of the control cam 10 is provided for bringing the end $122_c$ of the switching lever 122 in proximity to the weight 119 on the transfer lever 118 and for assuring the closure of the switch SW5 by stopping the rotation of the switching lever 122, and the height of the pedestal portion $10_h$ is so selected that, when the control cam 10 is rotated and the cut lever 125 is brought onto the pedestal $10_h$, the switch SW4 is not closed by the cut lever 125.

MANUAL OPERATION OF TONE ARM

When a record disc placed on the turntable is played by manually bringing the tone arm to a desired part of the record, the knob M1 is first moved to the "MANU" position until the ball 56 of the selecting arm 53 engages the corresponding hole $54_a$ of the plate 54. Thus, the interlinking lever 59 is pulled down as shown in FIG. 2, and the projection $32_a$ of the selecting lever 32 is brought into the proximity of the moving lever 43. The leftwardly bent end of the interlinking lever 59 rotates the lever 60 counter-clockwise, so that the other end of the lever 60 turns the holding lever 38 in the clockwise direction, whereby the end $38_a$ thereof is widely separated from the pin 21 on the arm 19 for allowing free rotation of the tone arm 3. Furthermore, the cam lever 64, one end of which is engaging the pin 62 on the interlinking lever 59, is rotated in the clockwise direction, and the higher end formed into a cam portion $64_c$, as shown in FIG. 4, of the cam lever 64 pushes up the shaft 71 having the cam follower 75 against the resilience of the spring 73, whereby the pin 74 of the cam follower 75 is kept in a floating state at a lever shallower than the shallow groove H in the outer peripheral groove $10_k$ of the control cam 10.

The button $B_3$ for starting the reproduction of the record is then pushed, and the switch SW1 is thereby closed. The auxiliary motor 6 is then started and the control cam 10 is rotated as described above. However, the moving lever 43 is abutting against the projection $32_a$ of the select lever 32, regardless of the rotation of the rotating plate 40, and is held at the position by causing slip between the planar spring 41 and the braking felt 44. When the shaft 51 of the arm lifter is brought into the lower cam portion $40_b$ of the rotating plate 40, the upper end of the spring 68 is separated from the arm 19 for the tone arm 3, and the tone arm is rotated freely.

Since the pin 74 of the cam follower 75 is pushed upward by the cam lever 64 when the control cam 10 is rotated, the pin 74 is not shifted to deeper portions $L_1$, $L_2$, and $L_3$ of the outer peripheral groove $10_k$, but is shifted to the shallower circular groove H. For this reason, the shaft 85 of the spindle 83 is moved only in the vertical direction by the cam follower 80. Since the cam follower 75 is not rotated, the lower claws 87 of the spindle 83 are not closed, and the records supported on the lower claws 87 are not brought down onto the turntable.

It should be noted that the operation of the record changer after the termination of the reproduction of record is quite similar to those described hereinbefore.

REPETITION AND INTERRUPTION OF RECORD REPRODUCTION

When it is desired to repeat the reproduction of records, a repetition button $B_4$ having a well known locking mechanism (not shown) is depressed, and the switch SW1 provided in parallel with the switch SW5 is thereby kept closed. In this case, the records supported on the spindle 83 are successively brought down onto the turntable and reproduced, and the last record may be reproduced repeatedly, despite the fact that the shaft 85 of the spindle 83 is elevated, after all of the records are brought down on the turntable and the switch SW5 is thereby opened.

When it is desired that the reproduction of a record be interrupted regardless of whether other records are still supported on the spindle or not, another button $B_5$ for interrupting the reproduction is depressed. The button $B_5$ is also provided with a well known locking mechanism (not shown) as that provided for the button $B_4$. When the button $B_5$ is depressed, the switch SW2 is thereby opened and the switch SW3 is closed. As a result, the auxiliary motor is started, although the record changer is still in the reproducing operation of a record, and the tone arm is thereby brought back to the arm rest. When the control cam 10 in then rotated to the stop position as shown in FIGS. 1 and 3, the switch SW4 is opened because the cut lever 125 is now above a projection of the control cam 10. Thus, the switch SW4 is opened, and the motor PM and the auxiliary motor 6 are stopped.

Although it has not been described in this example of the record changer, any possibility of picking up noises from the auxiliary motor 6 or else can be eliminated by providing a notch on the outer periphery of the control cam 10 or by utilizing the notch $10_c$ or $10_g$ for grounding the reproduction circuit while it is not being used.

In the record changer according to the present invention, since the upper claws 95 are operated by the vertical movement of the spindle shaft 85 and the lower claws 87 are operated by the rotating movement of the same shaft 85, various advantageous features, such as the stabilization of the support of the records, reduction of the moving range of the spindle shaft, and the economization of the required driving power, can be obtained. Furthermore, the vertical movement of the spindle shaft 85 is attained by pushing the lower end of the shaft 85 by the cam follower 80, one end of which is engaging the inner peripheral cam portion $10_i$ of the control cam, and the rotating movement of the same shaft 85 is realized by the spindle rotating plate 107 rotated by the cam follower 75, one end of which is engaging the outer peripheral groove $10_k$ of the same control cam 10, whereby the constructions of the spindle shaft 85 and the related mechanism are much simplified, and the record supporting operation and the record detecting operation of the spindle are definitely assured.

While the above invention has been described with respect to the preferred embodiment thereof, it will be obvious to one skilled in the art that various changes and modifications can be made without departing from the spirit and scope of the invention.

We claim:

1. A record changer including a tone arm and a turntable and comprising:

a. a hollow record spindle for receiving a stack of records;

b. upper claw means mounted within said spindle and having a closed position which permits records to slide over said upper claw means, and having an open position wherein said upper claw means extend through a window in said spindle for supporting records above said claw means;

c. lower claw means mounted within said spindle below said upper claw means and having a closed position which permits a record to slide thereover and fall upon the turntable, and having an open position for initially supporting records on said spindle said lower claw means being normally kept in the open position;

d. spindle shaft means mounted within said spindle for axial and rotational movement;

e. upper claw operating means mounted within said spindle for opening and closing said upper claw means in response to up and down movement of said shaft;

f. lower claw operating means mounted within said spindle for opening and closing said lower claw means in response to rotational movement of said shaft;

g. rotatable cam means for controlling the movement of the tone arm and having a first and a second cam surface;

h. first cam follower means controlled by said first cam surface for imparting up and down axial movement to said shaft for opening and closing said upper claw means;

i. second cam follower means controlled by said second cam surface for imparting reversible rotational movement to said shaft for opening and closing said lower claw means;

j. means for rotating said cam; and k. means for keeping said second cam follower means from engagement with said second cam surface to prevent the rotation of said shaft during a manual operation;

whereby with said lower claw means kept in the open position, axial movement of said shaft in one axial direction closes said upper claw means so that records on said spindle are initially supported by said lower claw means; and whereby axial movement of said shaft in the opposite axial direction opens said upper claw means so that all but the lowermost record are supported thereby, and rotation of said shaft in one angular direction closes said lower claw means so that the lowermost record falls upon the turntable.

2. A record changer as defined in claim 1 further comprising spring-biased claw holder means mounted in said spindle for opening said upper claw means when said spindle shaft is moved in said opposite axial direction.

3. A record changer as defined in claim 2 further comprising spring means for biasing said lower claw means to the open position, and a cam fixed to said spindle shaft for closing said lower claw means against the spring bias when said shaft is rotated in said opposite angular direction.

4. A record changer as defined in claim 1 wherein said rotatable cam means has a third cam surface which is engageable with said second cam follower means during the manual operation to prevent rotation of said second cam follower means.

5. A record changer as defined in claim 4 wherein said third cam surface is formed by a circumferential groove formed in said rotatable cam means.

6. A record changer as defined in claim 4 wherein said second cam follower means includes a horizontally disposed second cam follower, a pin fixed at one end of said second cam follower, said pin being engageable selectively with one of said second and third cam surfaces, and means for supporting said second cam follower for vertical movement, whereby said pin is kept in engagement with said third cam surface during the manual operation and with said second cam surface except during the manual operation.

* * * * *